Patented Sept. 24, 1929

1,729,185

UNITED STATES PATENT OFFICE

BERTHOLD REDLICH, OF FELDKIRCHEN, NEAR MUNICH, GERMANY

PROCESS FOR PREPARING EMULSIONS OF LIQUID OR DISSOLVED SUBSTANCES

No Drawing. Application filed October 18, 1927, Serial No. 227,046, and in Germany July 13, 1926.

The method hitherto employed for preparing emulsions of substances which are insoluble in water, as for example of oil in water, consists mainly in adding an auxiliary substance, the so-called emulsifying agent, to the substances to be emulsified and producing the emulsion by gradually increasing the quantity of the added water, whilst vigorously stirring or shaking the contents. The process can also be reversed by adding, and stirring, the oil to a definite quantity of water mixed with the emulsifying agent.

This procedure involves great disadvantages and does not always lead to the desired result. The uniformity and purity of the emulsified portions, and the degree of dispersion, upon which the virtue and the stability of every emulsion are mainly dependent, often leave much to be desired. The selection of the appropriate emulsifying agent, which remains in the emulsion as a dissolved foreign substance, involves numerous difficulties. Nor is it possible in accordance with this method to convert substances in pure water without any foreign substance into a concentrated emulsion that will keep.

In accordance with the present process it is possible with certainty and without the addition of dissolved foreign substances to prepare emulsions which will keep and which possess a high degree of dispersion.

In order to carry out the process, the substance to be emulsified, for example oil, is intimately mixed with a solid powdery substance of great absorptive capacity and porosity and the product, whilst stirring, is then added to the water. An extremely fine and lasting emulsion is thus formed instantaneously, whilst the solid substance employed is precipitated. Thus, only a very small portion of the solid substance remains behind in the emulsion and is of no consequence whatsoever in the use of the latter. Generally speaking the quantity of the solid substance used should not be less than two or three times that of the substance which is to be emulsified, yet nevertheless this proportion depends upon the nature of the products which are to be emulsified.

Appropriate to the carrying out of the present process are, for example, dried, colloidal precipitated silicic acid, and such alumina, ferric oxide and other inorganic powdery substances which meet the above mentioned physical requirements.

In this way and by means of a purely physical process all liquid or dissolved substances can be converted into a stable emulsion. Owing to their high degree of dispersion, these emulsions possess remarkable and valuable properties. They behave like purely colloidal solutions and are separated in flakes by acids or by electrolytes. Emulsions of this kind can be concentrated as desired, by means of slow evaporation, if necessary in vacuo, by means of centrifugal force, or in any other way. In concentrations up to about 40 to 50% these emulsions are of a milk-like character and of a buttery character in higher concentrations. Concentrations up to 90% and even higher can be obtained, the emulsified substance being soluble in water, as can be proved by submitting the concentrated emulsion to the action of the water.

In the preparation of higher concentrations it is advantageous, though not actually necessary, to add very small quantities of protective colloids or stabilizators, for example soap.

The present process has a great advantage over the familiar process inasmuch as the emulsions prepared according to the present process are very pure. The solid substances used are almost entirely precipitated after the prepared emulsions have been allowed to stand for a little while, and the remainder, leaving only traces, can be expelled by mechanical means, more particularly by centrifuge, without detroying the emulsion. It is owing to the great purity of the emulsions prepared in this manner that they can be brought to a high degree of concentration by evaporation, centrifugal force or the like, whilst at the same time retaining their solubility in water.

When carrying out the described process in actual practice it is of importance first of all to eliminate the salts adhering to the absorbent solid substances, for example SiO2. Further, it is necessary to eliminate the moisture which adheres very closely to the above mentioned absorbent substances. This is effected, immediately before the preparation of the mixture, by means of drying the substances, if need be, in a vacuum. If this is not done, colloids will form in the capillary spaces, colloids which nevertheless contain water in the inner phase and other substances for example oil, in the outer phase, and which do not behave like hydrosoles, that is to say, hydrophile, but like oils, i. e., hydrophobe. This can be recognized at the outset from the fact that a portion of the powder when the latter is stirred in the water is not, as is usual, precipitated, but floats on the surface of the water.

Further, it is necessary to see that the substance which is to be converted into a hydrosole form is not added in too large quantities to the absorption substance. Preferably, one half of the maximum absorbed quantity should be selected, that is 15 to 25 per cent by weight. If this quantity is exceeded to any greater extent, superfat powders will be obtained which float on the water and which it is difficult, if not impossible, to convert into hydrosoles.

Similar difficulties ensue if the absorbent substance is not uniformly permeated with the absorbed substance, in which case some portions are supersaturated. In order to avoid this it is necessary to use the substances which are to be converted into a hydrosole form, solutions, &c., in as minute and uniform particles as possible, for example, in the form of a spray. Any partial supersaturation arising in spite of this precaution can be rendered harmless by submitting the powdery mixture received to the intensive frictional action of sets of rollers, mills, or the like. Thereby, an effect which could not be anticipated was produced, namely, that the supersaturated particles give up their excess easily, and absolutely uniformly to the poorer particles.

The hydrosoles produced in accordance with the present process are distinguished, despite their high concentration and the absence of protective colloids, by their extraordinary keeping qualities. The hydrosoles of oils are solutions having the typical properties of milk, the resin hydrosoles on the contrary, even when in a high degree of concentration, are clear, coloured liquids, which even when evaporated to the drying point remain soluble in water and can only be separated in flakes by chemical means. All of them have in common that they can be directly mixed with water in any desired proportion and behave in every respect like water solutions.

Claims:

1. A process for preparing emulsions of liquid or dissolved inorganic substances, according to which to a powdery inorganic substance of great absorptive capacity a liquid or dissolved substance is added and this mixture stirred in water.

2. A process for preparing emulsions of liquid or dissolved substances, according to which to pure colloidal precipitated inorganic powdery substances the liquid or dissolved substance is added and the mixture stirred in water.

3. A process for preparing emulsions of liquid or dissolved substances according to which to a powdery inorganic substance of high absorptive capacity is uniformly added a liquid or dissolved form of the substance which is to be converted into the form of a hydrosole, the quantity thus added being far below the absorptive capacity of the powder and the resultant product stirred in water.

4. A process for preparing emulsions of liquid or dissolved substances consisting in treating a powdery inorganic substance of great absorptive capacity to remove impurities, removing moisture from said powder, adding to said powder the material to be treated and finally stirring said material with water.

5. A process for preparing emulsions of liquid or dissolved substances consisting in adding to a powdery inorganic substance of great absorptive capacity the substance to be emulsified in minute particles in a manner to avoid local excess; finely grinding the mixture, and mixing the same with water.

6. A process for preparing emulsions of liquids or dissolved substances according to which to powdery inorganic substances of great absorptive capacity is added the liquid or dissolved substance, the mixture stirred in water and the solid substance eliminated.

7. A process for preparing emulsions of liquid or dissolved substances, according to which to inorganic powdery substances of great absorptive capacity is added the liquid or dissolved substance and the mixture stirred in water, then thickening the emulsion.

Signed at Munich, Bavaria, Germany, this 23rd day of September, A. D. 1927.

BERTHOLD REDLICH.